United States Patent
Magnus

(10) Patent No.: US 10,436,299 B2
(45) Date of Patent: Oct. 8, 2019

(54) STATIONARY STEERING WHEEL ASSEMBLY AND METHOD

(71) Applicant: STEERING SOLUTIONS IP HOLDING CORPORATION, Saginaw, MI (US)

(72) Inventor: Brian J. Magnus, Frankenmuth, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 182 days.

(21) Appl. No.: 15/191,036

(22) Filed: Jun. 23, 2016

(65) Prior Publication Data

US 2016/0375928 A1    Dec. 29, 2016

Related U.S. Application Data

(60) Provisional application No. 62/184,525, filed on Jun. 25, 2015.

(51) Int. Cl.
| | |
|---|---|
| *B62D 1/181* | (2006.01) |
| *B62D 1/183* | (2006.01) |
| *F16H 25/22* | (2006.01) |
| *B60R 25/0215* | (2013.01) |
| *B60R 25/021* | (2013.01) |

(52) U.S. Cl.
CPC ......... *F16H 25/2204* (2013.01); *B62D 1/181* (2013.01); *B62D 1/183* (2013.01); *B60R 25/021* (2013.01); *B60R 25/0215* (2013.01)

(58) Field of Classification Search
CPC .......... B62D 1/18; B62D 1/181; B62D 1/183; B62D 1/184; B62D 1/185; B62D 1/20; B62D 1/286; B60R 25/0211; B60R 25/0215; B60R 25/02153
See application file for complete search history.

(56) References Cited

U.S. PATENT DOCUMENTS

| | | |
|---|---|---|
| 1,795,567 A | 3/1931 | Maurice |
| 3,369,425 A | 2/1968 | Runkle et al. |
| 3,386,309 A | 6/1968 | Reed et al. |
| 3,396,600 A | 8/1968 | Zeigler et al. |
| 3,782,492 A | 1/1974 | Hollins |

(Continued)

FOREIGN PATENT DOCUMENTS

| | | |
|---|---|---|
| CN | 1550395 A | 12/2004 |
| CN | 1722030 | 1/2006 |

(Continued)

OTHER PUBLICATIONS

Van der Jagt, Pim; "Prediction of Steering Efforts During Stationary or Slow Rolling Parking Maneuvers"; Ford Forschungszentrum Aachen GmbH.; Oct. 27, 1999; 20 pages.

(Continued)

*Primary Examiner* — Barry Gooden, Jr.

(57) ABSTRACT

A stationary steering wheel assembly includes a steering wheel connected to an axially extending column. The assembly also includes a steering wheel locking component engageable with the steering wheel and moveable between a first position and a second position, the first position locking the steering wheel to prevent rotation and the second position unlocking the steering wheel to allow rotation of the steering wheel.

12 Claims, 2 Drawing Sheets

(56) References Cited

U.S. PATENT DOCUMENTS

| | | |
|---|---|---|
| 4,138,167 A | 2/1979 | Ernst et al. |
| 4,315,117 A | 2/1982 | Kokubo et al. |
| 4,337,967 A | 7/1982 | Yoshida et al. |
| 4,476,954 A | 10/1984 | Johnson et al. |
| 4,503,300 A | 3/1985 | Lane, Jr. |
| 4,503,504 A | 3/1985 | Suzumura et al. |
| 4,509,386 A | 4/1985 | Kimberlin |
| 4,535,645 A | 8/1985 | De Bisschop et al. |
| 4,559,816 A | 12/1985 | Ebert et al. |
| 4,561,323 A | 12/1985 | Stromberg |
| 4,570,776 A | 2/1986 | Iwashita et al. |
| 4,598,604 A | 7/1986 | Sorsche et al. |
| 4,602,520 A | 7/1986 | Nishikawa et al. |
| 4,633,732 A | 1/1987 | Nishikawa et al. |
| 4,661,752 A | 4/1987 | Nishikawa et al. |
| 4,669,325 A | 6/1987 | Nishikawa et al. |
| 4,691,587 A | 9/1987 | Farrand et al. |
| 4,785,684 A | 11/1988 | Nishikawa et al. |
| 4,811,580 A | 3/1989 | Jang |
| 4,836,566 A | 6/1989 | Birsching |
| 4,881,020 A | 11/1989 | Hida et al. |
| 4,893,518 A | 1/1990 | Matsumoto et al. |
| 4,901,544 A | 2/1990 | Jang |
| 4,901,593 A | 2/1990 | Ishikawa |
| 4,921,066 A | 5/1990 | Conley |
| 4,941,679 A | 7/1990 | Baumann et al. |
| 4,943,028 A | 7/1990 | Hoffmann et al. |
| 4,962,570 A | 10/1990 | Hosaka et al. |
| 4,967,618 A | 11/1990 | Matsumoto et al. |
| 4,976,239 A | 12/1990 | Hosaka |
| 5,048,364 A | 9/1991 | Minamoto et al. |
| 5,226,853 A | 7/1993 | Courgeon |
| 5,240,284 A | 8/1993 | Takada et al. |
| 5,295,712 A | 3/1994 | Omura |
| 5,311,432 A | 5/1994 | Momose |
| 5,319,803 A | 6/1994 | Allen |
| 5,428,873 A | 7/1995 | Hitchcock et al. |
| 5,488,555 A | 1/1996 | Asgari et al. |
| 5,590,565 A | 1/1997 | Palfenier et al. |
| 5,606,892 A | 3/1997 | Hedderly |
| 5,613,404 A | 3/1997 | Lykken et al. |
| 5,618,058 A | 4/1997 | Byon |
| 5,668,721 A | 9/1997 | Chandy |
| 5,678,454 A | 10/1997 | Cartwright et al. |
| 5,690,362 A | 11/1997 | Peitsmeier et al. |
| 5,737,971 A | 4/1998 | Riefe et al. |
| 5,765,116 A | 6/1998 | Wilson-Jones et al. |
| 5,813,699 A | 9/1998 | Donner et al. |
| 5,890,397 A | 4/1999 | Stoner et al. |
| 5,893,580 A | 4/1999 | Hoagland et al. |
| 5,911,789 A | 6/1999 | Keipert et al. |
| 5,931,250 A | 8/1999 | Kagawa et al. |
| 5,941,130 A | 8/1999 | Olgren et al. |
| 6,041,677 A | 3/2000 | Reh et al. |
| 6,070,686 A | 6/2000 | Pollmann |
| 6,079,513 A | 6/2000 | Nishizaki et al. |
| 6,142,523 A | 11/2000 | Bathis et al. |
| 6,170,862 B1 | 1/2001 | Hoagland et al. |
| 6,220,630 B1 | 4/2001 | Sundholm et al. |
| 6,227,571 B1 | 5/2001 | Sheng et al. |
| 6,234,040 B1 | 5/2001 | Weber et al. |
| 6,277,571 B1 | 5/2001 | Sheng et al. |
| 6,264,239 B1 | 7/2001 | Link |
| 6,301,534 B1 | 10/2001 | Mcdermott, Jr. et al. |
| 6,343,993 B1 | 2/2002 | Duval et al. |
| 6,354,622 B1 | 3/2002 | Ulbrich et al. |
| 6,354,626 B1 | 3/2002 | Cartwright |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,460,427 B1 | 10/2002 | Hedderly |
| 6,571,587 B2 | 6/2003 | Dimig et al. |
| 6,578,449 B1 | 6/2003 | Anspaugh et al. |
| 6,611,745 B1 | 8/2003 | Paul |
| 6,612,198 B2 | 9/2003 | Rouleau et al. |
| 6,612,393 B2 | 9/2003 | Bohner et al. |
| 6,819,990 B2 | 11/2004 | Ichinose |
| 7,021,416 B2 | 4/2006 | Kapaan et al. |
| 7,025,380 B2 | 4/2006 | Arihara |
| 7,048,305 B2 | 5/2006 | Muller |
| 7,062,365 B1 | 6/2006 | Fei |
| 7,140,213 B2 | 11/2006 | Feucht et al. |
| 7,159,904 B2 | 1/2007 | Schafer et al. |
| 7,213,842 B2 | 5/2007 | Uehle et al. |
| 7,258,365 B2 | 8/2007 | Kahlenberg et al. |
| 7,261,014 B2 | 8/2007 | Arihara |
| 7,290,800 B2 | 11/2007 | Schwarzbich et al. |
| 7,295,904 B2 | 11/2007 | Kanevsky et al. |
| 7,308,964 B2 | 12/2007 | Hara et al. |
| 7,410,190 B2 | 8/2008 | Sawada et al. |
| 7,428,944 B2 | 9/2008 | Gerum |
| 7,461,863 B2 | 12/2008 | Muller |
| 7,495,584 B1 | 2/2009 | Sorensen |
| 7,533,594 B2 | 5/2009 | Menjak et al. |
| 7,628,244 B2 | 12/2009 | Chino et al. |
| 7,719,431 B2 | 5/2010 | Bolourchi |
| 7,735,405 B2 | 6/2010 | Parks |
| 7,758,073 B1 | 7/2010 | Chou |
| 7,775,129 B2 | 8/2010 | Oike et al. |
| 7,784,830 B2 | 8/2010 | Ulintz |
| 7,793,980 B2 | 9/2010 | Fong |
| 7,862,079 B2 | 1/2011 | Fukawatase et al. |
| 7,975,569 B2 | 1/2011 | Klos |
| 7,894,951 B2 | 2/2011 | Norris et al. |
| 7,909,361 B2 | 3/2011 | Oblizajek et al. |
| 7,913,803 B2 | 3/2011 | Hidaka |
| 8,002,075 B2 | 8/2011 | Markfort |
| 8,011,265 B2 | 9/2011 | Menjak et al. |
| 8,021,235 B2 | 9/2011 | Tinnin et al. |
| 8,027,767 B2 | 9/2011 | Klein et al. |
| 3,055,409 A1 | 11/2011 | Tsuchiya |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,161,839 B2 | 4/2012 | Warashina |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,376,402 B2 | 2/2013 | Yoon et al. |
| 8,466,382 B2 | 6/2013 | Donicke |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B1 | 3/2014 | Szybalski et al. |
| 8,695,750 B1 | 4/2014 | Hammond et al. |
| 8,733,201 B2 | 5/2014 | Okano et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,910,540 B2 | 12/2014 | Bertet et al. |
| 8,948,993 B2 | 2/2015 | Schulman et al. |
| 8,950,543 B2 | 2/2015 | Heo et al. |
| 8,955,407 B2 | 2/2015 | Sakuma |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,039,041 B2 | 5/2015 | Buzzard et al. |
| 9,045,078 B2 | 6/2015 | Tovar et al. |
| 9,073,574 B2 | 7/2015 | Cuddihy et al. |
| 9,080,895 B2 | 7/2015 | Martin et al. |
| 9,092,093 B2 | 7/2015 | Jubner et al. |
| 9,108,584 B2 | 8/2015 | Rao et al. |
| 9,134,729 B1 | 9/2015 | Szybalski et al. |

(56) References Cited

U.S. PATENT DOCUMENTS

| | | | |
|---|---|---|---|
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,211 B2 | 1/2016 | Davidsson et al. |
| 9,235,987 B2 | 1/2016 | Green et al. |
| 9,238,409 B2 | 1/2016 | Lathrop et al. |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,296,410 B2 | 3/2016 | Isogai et al. |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop et al. |
| 9,352,752 B2 | 5/2016 | Cullinane et al. |
| 9,360,108 B2 * | 6/2016 | Pfenninger .............. F16H 61/22 |
| 9,360,865 B2 | 6/2016 | Yopp |
| 9,421,994 B2 | 8/2016 | Agbor et al. |
| 9,487,228 B2 | 11/2016 | Febre et al. |
| 9,616,914 B2 | 4/2017 | Stinebring et al. |
| 9,643,641 B1 | 5/2017 | Stinebring et al. |
| 9,663,136 B2 | 5/2017 | Stinebring et al. |
| 9,744,983 B2 | 8/2017 | Stinebring et al. |
| 9,845,106 B2 | 12/2017 | Bodtker |
| 9,849,904 B2 | 12/2017 | Rouleau |
| 9,852,752 B1 | 12/2017 | Chou et al. |
| 9,862,403 B1 * | 1/2018 | Rouleau .................. B62D 1/183 |
| 9,919,724 B2 | 3/2018 | Lubischer et al. |
| 10,131,375 B2 * | 11/2018 | Schmidt .................. B62D 1/181 |
| 2002/0171235 A1 | 11/2002 | Riefe et al. |
| 2003/0046012 A1 | 3/2003 | Yamaguchi |
| 2003/0094330 A1 | 5/2003 | Boloorchi et al. |
| 2003/0146037 A1 | 8/2003 | Menjak et al. |
| 2003/0183440 A1 * | 10/2003 | Thomas ............ B60R 25/02147 |
| | | 180/402 |
| 2003/0188598 A1 | 10/2003 | Cartwright |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0046379 A1 | 3/2004 | Riefe |
| 2004/0099083 A1 | 5/2004 | Choi et al. |
| 2004/0099468 A1 | 5/2004 | Chernoff et al. |
| 2004/0129098 A1 | 7/2004 | Gayer et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0081675 A1 | 4/2005 | Oshita et al. |
| 2005/0197746 A1 | 9/2005 | Pelchen et al. |
| 2005/0242562 A1 | 11/2005 | Ridgway et al. |
| 2005/0263996 A1 | 12/2005 | Manwaring et al. |
| 2005/0275205 A1 | 12/2005 | Ahnafield |
| 2006/0005658 A1 | 1/2006 | Armstrong et al. |
| 2006/0186658 A1 | 8/2006 | Yasuhara et al. |
| 2006/0202463 A1 | 9/2006 | Schwarzbich et al. |
| 2006/0219499 A1 * | 10/2006 | Organek ................ B60R 25/005 |
| | | 188/164 |
| 2006/0224287 A1 | 10/2006 | Izawa et al. |
| 2006/0237959 A1 * | 10/2006 | Dimig .................... B60R 25/02 |
| | | 280/776 |
| 2006/0244251 A1 | 11/2006 | Muller |
| 2006/0283281 A1 * | 12/2006 | Li .......................... B62D 1/181 |
| | | 74/495 |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0096446 A1 | 5/2007 | Breed |
| 2007/0126222 A1 | 6/2007 | Koya et al. |
| 2007/0158116 A1 | 7/2007 | Peppler |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0028884 A1 | 2/2008 | Monash |
| 2008/0047382 A1 | 2/2008 | Tomaru et al. |
| 2008/0079253 A1 | 4/2008 | Sekii et al. |
| 2008/0216597 A1 | 9/2008 | Iwakawa et al. |
| 2008/0238068 A1 | 10/2008 | Kumar et al. |
| 2008/0264196 A1 | 10/2008 | Schindler et al. |
| 2009/0024278 A1 | 1/2009 | Kondo et al. |
| 2009/0056493 A1 | 3/2009 | Dubay et al. |
| 2009/0107284 A1 | 4/2009 | Lucas et al. |
| 2009/0229400 A1 | 9/2009 | Ozsoylu et al. |
| 2009/0256342 A1 | 10/2009 | Cymbal et al. |
| 2009/0266195 A1 | 10/2009 | Tanke et al. |
| 2009/0276111 A1 | 11/2009 | Wang et al. |
| 2009/0280914 A1 * | 11/2009 | Kakutani ................ B62D 1/16 |
| | | 464/167 |
| 2009/0292466 A1 | 11/2009 | Mccarthy et al. |
| 2010/0152952 A1 | 6/2010 | Lee et al. |
| 2010/0218637 A1 | 9/2010 | Barroso |
| 2010/0222976 A1 | 9/2010 | Haug |
| 2010/0228417 A1 | 9/2010 | Lee et al. |
| 2010/0228438 A1 | 9/2010 | Buerkle |
| 2010/0280713 A1 | 11/2010 | Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2011/0314954 A1 | 12/2011 | Matsuno et al. |
| 2012/0136540 A1 | 5/2012 | Miller |
| 2012/0205183 A1 | 8/2012 | Rombold |
| 2012/0209473 A1 | 8/2012 | Birsching et al. |
| 2012/0215377 A1 | 8/2012 | Takemura et al. |
| 2012/0247259 A1 | 10/2012 | Mizuno et al. |
| 2012/0287050 A1 | 11/2012 | Wu |
| 2013/0002416 A1 | 1/2013 | Gazit |
| 2013/0087006 A1 | 4/2013 | Ohtsubo et al. |
| 2013/0104689 A1 | 5/2013 | Marutani et al. |
| 2013/0133463 A1 | 5/2013 | Moriyama |
| 2013/0158771 A1 | 6/2013 | Kaufmann |
| 2013/0174686 A1 * | 7/2013 | Hirche ............... B60R 25/02153 |
| | | 74/495 |
| 2013/0199866 A1 | 8/2013 | Yamamoto et al. |
| 2013/0205933 A1 | 8/2013 | Moriyama |
| 2013/0218396 A1 | 8/2013 | Moshchuk et al. |
| 2013/0233117 A1 | 9/2013 | Read et al. |
| 2013/0292955 A1 | 11/2013 | Higgins et al. |
| 2013/0325202 A1 | 12/2013 | Howard et al. |
| 2013/0325264 A1 | 12/2013 | Alcazar et al. |
| 2014/0028008 A1 | 1/2014 | Stadler et al. |
| 2014/0046542 A1 | 2/2014 | Kauffman et al. |
| 2014/0046547 A1 | 2/2014 | Kaufmann et al. |
| 2014/0111324 A1 | 4/2014 | Lisseman et al. |
| 2014/0116187 A1 | 5/2014 | Tinnin |
| 2014/0137694 A1 | 5/2014 | Sugiura |
| 2014/0277896 A1 | 9/2014 | Lathrop et al. |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer |
| 2015/0051780 A1 | 2/2015 | Hahne |
| 2015/0060185 A1 | 3/2015 | Feguri |
| 2015/0120142 A1 | 4/2015 | Park et al. |
| 2015/0137492 A1 | 5/2015 | Rao et al. |
| 2015/0203145 A1 | 7/2015 | Sugiura et al. |
| 2015/0203149 A1 | 7/2015 | Katayama et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283998 A1 | 10/2015 | Lind et al. |
| 2015/0324111 A1 | 11/2015 | Jubner et al. |

(56) References Cited

U.S. PATENT DOCUMENTS

| | | | |
|---|---|---|---|
| 2015/0375769 | A1 | 12/2015 | Abboud et al. |
| 2016/0009332 | A1 | 1/2016 | Sirbu |
| 2016/0016604 | A1 | 1/2016 | Johta et al. |
| 2016/0075371 | A1 | 3/2016 | Varunkikar et al. |
| 2016/0082867 | A1 | 3/2016 | Sugioka et al. |
| 2016/0114828 | A1 | 4/2016 | Tanaka et al. |
| 2016/0185387 | A1 | 6/2016 | Kuoch |
| 2016/0200246 | A1 | 7/2016 | Lisseman et al. |
| 2016/0200343 | A1 | 7/2016 | Lisseman et al. |
| 2016/0200344 | A1 | 7/2016 | Sugioka et al. |
| 2016/0207538 | A1 | 7/2016 | Urano et al. |
| 2016/0209841 | A1 | 7/2016 | Yamaoka et al. |
| 2016/0229450 | A1 | 8/2016 | Basting et al. |
| 2016/0231743 | A1 | 8/2016 | Bendewald et al. |
| 2016/0244070 | A1 | 8/2016 | Bendewald et al. |
| 2016/0244086 | A1 | 8/2016 | Moriyama |
| 2016/0252133 | A1 | 9/2016 | Caverly |
| 2016/0318540 | A1 | 11/2016 | King |
| 2016/0318542 | A1 | 11/2016 | Pattok et al. |
| 2016/0347347 | A1 | 12/2016 | Lubischer |
| 2016/0347348 | A1 | 12/2016 | Lubischer |
| 2016/0362084 | A1 | 12/2016 | Martin et al. |
| 2016/0362117 | A1 | 12/2016 | Kaufmann et al. |
| 2016/0362126 | A1 | 12/2016 | Lubischer |
| 2016/0368522 | A1 | 12/2016 | Lubischer et al. |
| 2016/0375770 | A1 | 12/2016 | Ryne et al. |
| 2016/0375860 | A1 | 12/2016 | Lubischer et al. |
| 2016/0375923 | A1 | 12/2016 | Schulz et al. |
| 2016/0375924 | A1 | 12/2016 | Bodtker et al. |
| 2016/0375925 | A1 | 12/2016 | Lubischer et al. |
| 2016/0375926 | A1 | 12/2016 | Lubischer et al. |
| 2016/0375927 | A1 | 12/2016 | Schulz |
| 2016/0375928 | A1 | 12/2016 | Magnus |
| 2016/0375929 | A1 | 12/2016 | Rouleau |
| 2016/0375931 | A1 | 12/2016 | Lubischer |
| 2017/0029009 | A1 | 2/2017 | Rouleau |
| 2017/0029018 | A1 | 2/2017 | Lubischer |
| 2017/0097071 | A1 | 4/2017 | Galehr |
| 2017/0106894 | A1 | 4/2017 | Bodtker |
| 2017/0106895 | A1 | 4/2017 | Jager et al. |
| 2017/0113589 | A1 | 4/2017 | Riefe |
| 2017/0113712 | A1 | 4/2017 | Watz |
| 2017/0151975 | A1* | 6/2017 | Schmidt .............. B62D 1/181 |
| 2017/0158222 | A1 | 6/2017 | Schulz et al. |
| 2017/0294120 | A1 | 10/2017 | Ootsuji |
| 2017/0297606 | A1 | 10/2017 | Kim et al. |
| 2017/0341677 | A1 | 11/2017 | Buzzard |
| 2017/0361863 | A1 | 12/2017 | Rouleau |
| 2017/0369091 | A1 | 12/2017 | Nash |
| 2018/0029628 | A1 | 2/2018 | Sugishita |
| 2018/0050720 | A1 | 2/2018 | King et al. |
| 2018/0072339 | A1 | 3/2018 | Bodtker |
| 2018/0079441 | A1 | 3/2018 | Mckinzie et al. |
| 2018/0086378 | A1 | 3/2018 | Bell et al. |
| 2018/0111639 | A1 | 4/2018 | Bodtker et al. |
| 2018/0148084 | A1 | 5/2018 | Nash et al. |
| 2018/0154932 | A1 | 6/2018 | Rakouth et al. |
| 2018/0229753 | A1 | 8/2018 | Magnus et al. |
| 2018/0238400 | A1* | 8/2018 | Magnus .............. F16D 15/00 |
| 2018/0251147 | A1 | 9/2018 | Heitz et al. |
| 2018/0273081 | A1 | 9/2018 | Lubischer et al. |
| 2018/0319367 | A1 | 11/2018 | Ting |
| 2019/0002010 | A1 | 1/2019 | Cao et al. |

FOREIGN PATENT DOCUMENTS

| | | |
|---|---|---|
| CN | 1736786 | 2/2006 |
| CN | 101037117 | 9/2007 |
| CN | 101041355 | 9/2007 |
| CN | 101049814 A | 10/2007 |
| CN | 101291840 A | 10/2008 |
| CN | 101402320 A | 4/2009 |
| CN | 101596903 | 12/2009 |
| CN | 201534560 U | 7/2010 |
| CN | 101954862 A | 1/2011 |
| CN | 102161346 A | 8/2011 |
| CN | 102452391 | 5/2012 |
| CN | 102452411 A | 5/2012 |
| CN | 102523738 A | 6/2012 |
| CN | 102574545 A | 7/2012 |
| CN | 202337282 U | 7/2012 |
| CN | 102806937 A | 12/2012 |
| CN | 103085854 A | 5/2013 |
| CN | 103129599 A | 6/2013 |
| CN | 103419840 | 12/2013 |
| CN | 103448785 A | 12/2013 |
| CN | 103569185 A | 2/2014 |
| CN | 103587571 A | 2/2014 |
| CN | 203793405 U | 8/2014 |
| CN | 204222957 U | 3/2015 |
| CN | 104755346 A | 7/2015 |
| DE | 4310431 A1 | 10/1994 |
| DE | 19523214 A1 | 1/1997 |
| DE | 19923012 | 11/2000 |
| DE | 19954505 A1 | 5/2001 |
| DE | 10212782 A1 | 10/2003 |
| DE | 102005032528 | 1/2007 |
| DE | 102005056438 A1 | 6/2007 |
| DE | 102006025254 | 12/2007 |
| DE | 102006025254 A1 | 12/2007 |
| DE | 1020081057313 A1 | 10/2009 |
| DE | 102010025197 A1 | 12/2011 |
| DE | 102015216326 B4 | 9/2016 |
| EP | 1559630 A2 | 8/2005 |
| EP | 1783719 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 | 5/2005 |
| FR | 3016327 A1 | 7/2015 |
| JP | S58191668 A | 11/1983 |
| JP | S60157963 A | 8/1985 |
| JP | H05162652 | 6/1993 |
| JP | 2006143117 A | 6/2006 |
| JP | 2007253809 A | 10/2007 |
| JP | 2012201334 A | 10/2012 |
| KR | 20100063433 A | 6/2010 |
| KR | 101062339 B1 | 9/2011 |
| KR | 20150010435 A | 1/2015 |
| WO | 2006099483 A1 | 9/2006 |
| WO | 2010082394 A1 | 7/2010 |
| WO | 2010116518 | 10/2010 |
| WO | 2014208573 A1 | 12/2014 |

OTHER PUBLICATIONS

China Patent Application No. 201510204221.5 Second Office Action dated Mar. 10, 2017, 8 pages.
CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
EP Application No. 15152834.6 Extended European Search Report dated Oct. 8, 2015, 7 pages.

(56) References Cited

OTHER PUBLICATIONS

European Application No. 12196665.9 Extended European Search Report dated Mar. 6, 2013, 7 pages.
European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "Fundamentals of Vehicle Dynamics"; Society of Automotive Enginers, Inc.; published 1992; 294 pages.
Kichun, et al.; "Development of Autonomous Car-Part II: A Case Study on the Implementation of an Autonomous Driving System Based on Distributed Architecture"; IEEE Transactions on Industrial Electronics, vol. 62, No. 8, Aug. 2015; 14 pages.
Office Action dated Aug. 29, 2016.
Partial European Search Report for related European Patent Application No. 14156903.8, dated Sep. 23, 2014, 6 pages.
Van Der Jagt, Pim; "Prediction of steering efforts during stationary or slow rolling parking maneuvers"; Jul. 2013, 20 pages.
Varunjikar, Tejas; Design of Horizontal Curves With DownGrades Using Low-Order Vehicle Dynamics Models; A Theisis by T. Varunkikar; 2011; 141 pages.
English translation regarding DE102015216326B4; 21 pgs.
Chinese Office Action & Search Report for Chinese Application No. 201610609647.3 dated Mar. 12, 2018, 5 pages no English translation available.
English Translation of Chinese Office Action & Search Report for Chinese Application No. 201610620335.2 dated Jan. 22, 2018, 9 pages.
English Translation of Chinese Office Action & Search Report for Chinese Application No. 201610642300.9 dated Feb. 7, 2018, 16 pages.
English Translation of Chinese Office Action & Search Report for Chinese Application No. 201610830808.1 dated Apr. 3, 3018, 12 pages.
English Translation of Chinese Office Action & Search Report for Chinese Application No. 201610830809.6 dated Mar. 12, 2018, 6 pages.
English Translation of Chinese Office Action & Search Report for Chinese Application No. 201610830810.9 dated Jan. 31, 2018, 11 pages.
English Translation of Chinese Office Action and Search Report for Chinese Application No. 201611113746.9 dated May 4, 2018, 7 pages.
English Translation of Chinese Office Action for Chinese Application No. 201610427896.0 dated May 28, 2018, 10 pages.

* cited by examiner

STATIONARY STEERING WHEEL ASSEMBLY AND METHOD

CROSS REFERENCE TO RELATED APPLICATION

This patent application claims priority to U.S. Provisional Patent Application Ser. No. 62/184,525, filed Jun. 25, 2015, which is incorporated herein by reference in its entirety.

BACKGROUND OF THE INVENTION

The embodiments described herein relate to steering wheel assemblies and, more particularly, to a stationary steering wheel assembly, as well as methods associated with controlling the stationary steering wheel assembly.

As autonomously driven vehicles are developed, a number of opportunities will evolve related to comfort, entertainment and functionality for drivers. Steering wheels are commonly limited to standard driving positions due to the need for a driver to handle the steering wheel during operation of the vehicle. These limitations may be unnecessary during an autonomous driving mode of a vehicle.

SUMMARY OF THE INVENTION

According to one aspect of the disclosure, a stationary steering wheel assembly includes a steering wheel connected to an axially extending column. The assembly also includes a steering wheel locking component engageable with the steering wheel and moveable between a first position and a second position, the first position locking the steering wheel to prevent rotation and the second position unlocking the steering wheel to allow rotation of the steering wheel.

According to another aspect of the disclosure, a stationary steering wheel assembly includes a steering wheel. Also included is a steering shaft operatively coupled to the steering wheel. Further included is a lower shaft operatively coupled to the steering shaft. Yet further included is a steering shaft locking component engageable with the steering shaft and moveable between a first position and a second position, the first position locking the steering shaft to prevent axial translation and the second position unlocking the steering shaft to allow axial translation of the steering shaft.

According to yet another aspect of the disclosure, a method of controlling a stationary steering wheel assembly of an autonomous vehicle is provided. The method includes disengaging a steering wheel locking component from a steering wheel in a standard driving mode to allow rotation of the steering wheel. The method also includes engaging a steering shaft locking component with a steering shaft in the standard driving mode to prevent translation of the steering shaft and to allow rotation of the steering shaft upon rotation of the steering wheel.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
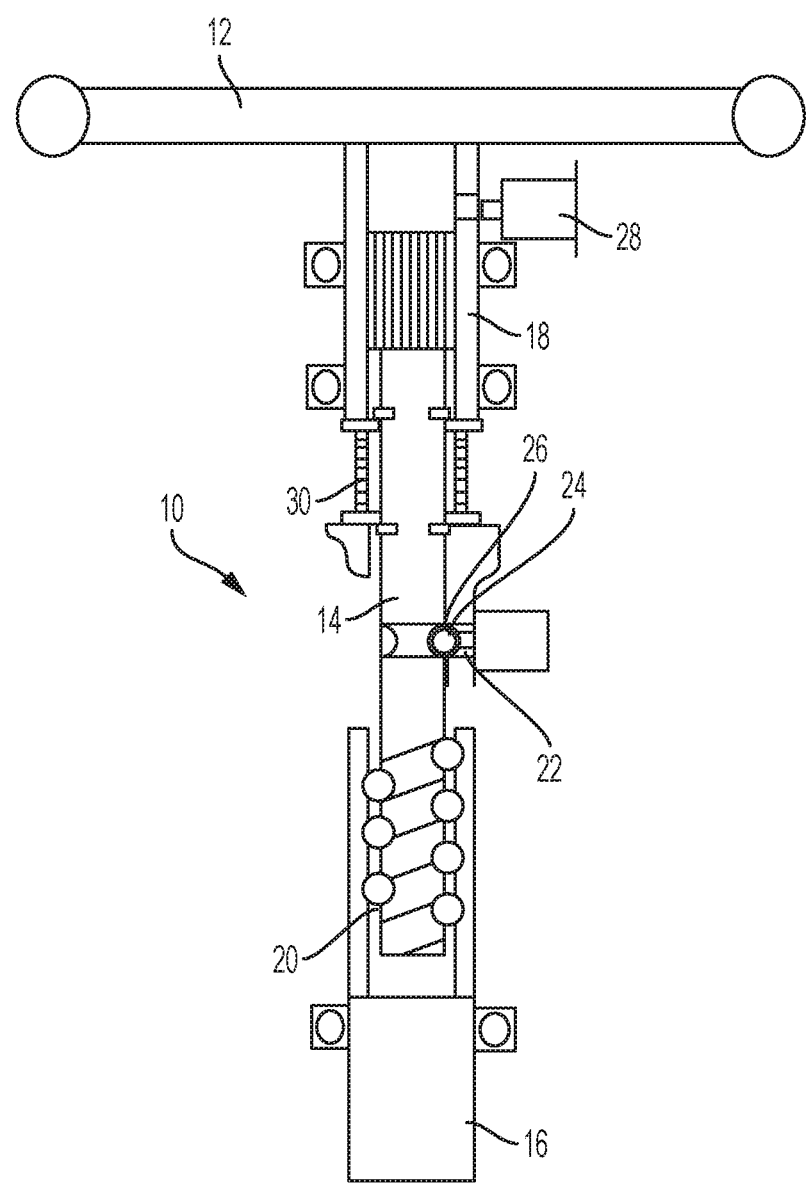
FIG. 1 is schematic illustration of a retractable steering column assembly.

Referring now to the Figures, where the invention will be described with reference to specific embodiments, without limiting same, FIG. 1 illustrates a stationary steering wheel assembly 10. The stationary steering wheel assembly 10 facilitates translation of a steering wheel 12 and a steering shaft 14 in a retractable manner. The stationary steering wheel assembly 10 also facilitates decoupling the steering wheel 12 from the steering shaft 14 to maintain the steering wheel 12 in a stationary (i.e., non-rotational) condition. These features are provided while maintaining a mechanical link between the road wheels of a vehicle and the steering wheel 12. This is particularly beneficial in embodiment where the assembly 10 is employed in a passenger vehicle equipped with Advanced Driver Assist System(s) to allow the vehicle to be autonomously controlled using sensing, steering, and/or braking technology. When the ADAS system is activated, the steering wheel is not required for vehicle control. Retraction of the steering wheel 12 and steering shaft 14 toward, and possibly into, the instrument panel greatly enhances user comfort by providing a driver with more space. The additional space provided facilitates additional workspace area or leg room, for example.

The embodiments described herein provide a retractable steering wheel while the vehicle is in an autonomous, or partially autonomous, driving mode. The operating conditions described herein for the steering wheel are standard driving mode, autonomous driving mode, and a transition mode therebetween.

In the standard driving mode, the steering wheel assembly 10 is extended to a location that is comfortably reached by a driver in a manner that allows the driver to fully handle and control the steering wheel. In this extended position, the steering wheel 12 is coupled to the steering shaft 14 and the steering shaft 14 is coupled to a lower shaft 16. The lower shaft 16 is operatively coupled to additional steering components that control the road wheels of the vehicle, thereby allowing the driver to control the road wheels in the standard driving mode.

Figure 2:
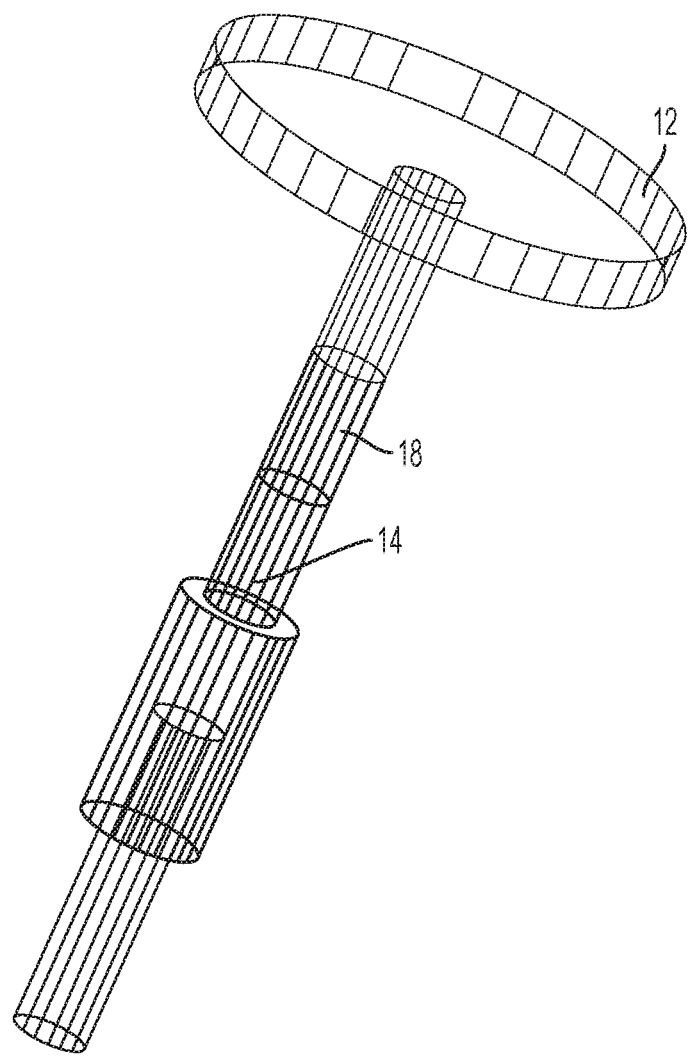
FIG. 2 is a perspective view of the retractable steering column assembly.

The steering wheel 12 coupling to the steering shaft 14 is made, at least in part, with a splined relationship and/or a groove-roller arrangement at location 18 (FIGS. 1 and 2). The steering shaft 14 is coupled to the lower shaft 16 with a ball screw 20. A steering shaft locking component 22 is extended in the standard driving mode to radially force an engagement member 24, such as a rolling ball, into an engagement feature 26 (also referred to herein as a receptacle) on the steering shaft 14, such as a groove dimensioned to at least partially receive the engagement member 24. In some embodiments, the steering shaft locking component 22 is a solenoid. Engagement of the engagement member 24 and the engagement feature 26 prevents the steering shaft 14 from translating and only allows rotation thereof. Torque and position from the driver are transmitted from the steering wheel 12 to the steering shaft 14 through the spline interface 18 described above and from the steering shaft 14 to the lower shaft 16 through balls and tracks of the ball screw 20. The lower shaft 16 is attached to a rack assisted electronic positioning system (EPS) that steers the road wheels. Feedback from the road wheels to the driver is transmitted in the reverse fashion.

During the autonomous driving mode, the driver will activate the ADAS system through some vehicle interface such as a switch or button. Upon activation, a steering wheel locking component 28 locks the steering wheel 12 from rotating by moving between a first position and a second position. In some embodiments, the first position and the second position are radial positions, such that radial engagement is facilitated by the steering wheel locking component 28. As a matter of safety and visual feedback, in some embodiments the retracted steering wheel remains stationary while the vehicle is in the autonomous driving mode. One way to accomplish the stationary steering wheel function while still maintaining a mechanical link to the road wheel steering system is to incorporate a differential gear in the steering linkage system, as described below.

In some embodiments, the steering wheel locking component 28 is a solenoid (FIG. 1) that extends and retracts for rotationally locking and unlocking the steering wheel 12 by radially engaging and disengaging a ball or the like 42 with the steering wheel 12.

A separate actuation system (not shown) that is not part of the column and wheel locking mechanisms at least partially retracts the steering wheel assembly 10 into the instrument panel of the vehicle. The rack EPS system steers the vehicle according to the ADAS system commands while the driver provides no steering inputs. As the rack EPS system moves the road wheels, the lower 16 shaft is rotated. When the lower 16 shaft rotates, the ball screw 20 forces the steering shaft 14 to translate in the upper spline 18 since the steering wheel 12 is fixed. As the steering shaft 14 translates, a centering spring pack 30 is compressed one way or the other depending on the direction of rotation of the lower shaft 16.

When the driver wants to transition back to the standard driving mode, the ADAS system is deactivated. Upon deactivation, the steering shaft locking component 22 is extended forcing the ball to the steering shaft 14. The centering spring 30, along with the rack EPS actuator, will provide force to direct the steering shaft 14 back to a center axial position. When the center position is achieved, the ball is forced into the track and the steering shaft 14 is locked axially. At this point, the ADAS system is informed through sensing that the steering wheel 12 is ready to be handed back to the driver. The steering wheel locking component 28 is released to allow rotation of the steering wheel and the separate actuation system extends the steering wheel assembly 10 back to the driver's preferred position.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A stationary steering wheel assembly comprising:
   a steering wheel assembly operatively connected to an axially extending column comprising a steering shaft;
   an engagement member moveable into and out of an engagement receptacle that is part of the steering shaft, engagement of the engagement member and the engagement receptacle preventing translation of the steering shaft, disengagement of the engagement member and the engagement receptacle allowing translation of the steering shaft; and
   a steering wheel locking component engageable with a steering wheel and moveable between a first position and a second position, the first position locking the steering wheel to prevent rotation, the second position unlocking the steering wheel to allow rotation of the steering wheel, the first position being a first radial position and the second position being a second radial position, wherein the steering wheel locking component is in the first radial position in an autonomous driving mode and in the second radial position in a standard driving mode, the autonomous driving mode having an advanced driving assist system controlling road wheels of a vehicle resulting in rotation of a lower shaft.

2. The stationary steering wheel assembly of claim 1, wherein the steering wheel locking component comprises a solenoid.

3. The stationary steering wheel assembly of claim 1, wherein the engagement member is a rolling ball and the engagement receptacle comprises a groove dimensioned to at least partially receive the rolling ball.

4. A stationary steering wheel assembly comprising:
   a steering shaft operatively coupleable to a steering wheel;
   a lower shaft operatively coupled to the steering shaft;
   a steering shaft locking component engageable with the steering shaft and moveable between a first position and a second position, the first position locking the steering shaft to prevent axial translation and the second position unlocking the steering shaft to allow axial translation of the steering shaft; and
   a steering wheel locking component engageable with the steering wheel and moveable between a first position and a second position, the first position locking the steering wheel to prevent rotation and the second position unlocking the steering wheel to allow rotation of the steering wheel, the steering wheel locking component comprising a solenoid.

5. The stationary steering wheel assembly of claim 4, wherein the steering shaft locking component comprises a solenoid.

6. The stationary steering wheel assembly of claim 4, wherein the steering wheel locking component is in the second position in a standard driving mode.

7. The stationary steering wheel assembly of claim 4, further comprising a spring pack in operative contact with the steering shaft to bias the steering shaft toward an axial center position to align the steering column locking component and a receptacle dimensioned to receive the steering column locking component in the first position of the steering shaft locking component.

8. The stationary steering wheel assembly of claim 4, wherein the steering shaft locking component is in the first position in a standard driving mode.

9. The stationary steering wheel assembly of claim 8, wherein the steering shaft rotates in response to rotation of the steering wheel when the steering shaft locking component is in the first position.

10. The stationary steering wheel assembly of claim 4, wherein the steering shaft locking component is in the second position in an autonomous driving mode, the autonomous driving mode comprising an advanced driving assist system controlling road wheels of a vehicle resulting in rotation of the lower shaft.

11. The stationary steering wheel assembly of claim 10, wherein the steering shaft is operatively coupled to the lower shaft with a ball screw.

12. The stationary steering wheel assembly of claim 11, wherein the ball screw coupling allows the steering shaft to translate upon rotation of the lower shaft in the autonomous driving mode.

* * * * *